United States Patent [19]

Weder et al.

[11] Patent Number: 5,327,635
[45] Date of Patent: Jul. 12, 1994

[54] METHOD OF MAKING A FLOWER POT OR FLOWER POT COVER WITH PLEATED SKIRT

[75] Inventors: Donald E. Weder; Joseph G. Straeter, both of Highland, Ill.

[73] Assignee: Highland Supply Corporation, Highland, Ill.

[21] Appl. No.: 48,390

[22] Filed: Apr. 14, 1993

Related U.S. Application Data

[60] Continuation of Ser. No. 938,724, Sep. 1, 1992, Pat. No. 5,259,106, which is a continuation of Ser. No. 693,906, May 1, 1991, Pat. No. 5,181,339, which is a division of Ser. No. 397,114, Aug. 22, 1989, Pat. No. 5,029,412, which is a continuation-in-part of Ser. No. 366,588, Jun. 15, 1989, Pat. No. 5,111,613, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.⁵ .............................................. B21D 35/00
[52] U.S. Cl. ........................................ 29/469; 47/72; 53/397; 156/217; 156/227
[58] Field of Search ................. 29/469, 432, 450, 452, 29/469.5, 525; 47/66, 72; 53/221, 397, 580; 156/196, 210, 217, 221, 227; 206/423; 215/100.5; 229/87.19; 248/101

[56] References Cited

U.S. PATENT DOCUMENTS

| | | |
|---|---|---|
| D. 254,659 | 4/1980 | Karotseris . |
| D. 292,562 | 11/1987 | Weder et al. . |
| D. 292,563 | 11/1987 | Weder . |
| D. 293,774 | 1/1988 | Weder et al. . |
| D. 293,775 | 1/1988 | Weder et al. . |
| 239,987 | 4/1881 | Shellenberger . |
| 726,668 | 12/1902 | Cheney . |
| 732,889 | 7/1903 | Paver . |
| 923,663 | 6/1909 | Kroeger . |
| 1,002,346 | 9/1911 | Weeks . |
| 1,052,379 | 2/1913 | Ranken . |
| 1,069,675 | 8/1913 | Claussen . |
| 1,206,708 | 11/1916 | Hutchins . |
| 1,421,027 | 6/1922 | Reynolds . |
| 1,421,628 | 7/1922 | Watkins . |
| 1,446,563 | 2/1923 | Hughes . |
| 1,610,652 | 12/1972 | Bouchard . |
| 1,693,435 | 11/1928 | Clarke . |
| 1,697,751 | 1/1929 | Blake . |
| 1,863,216 | 6/1932 | Wordingham . |
| 1,868,853 | 7/1932 | Sievers . |
| 1,920,533 | 8/1933 | Strauss . |
| 1,924,926 | 8/1933 | Gray . |
| 1,951,642 | 3/1934 | Augustin et al. . |
| 1,978,631 | 10/1934 | Herrlinger . |
| 1,979,771 | 11/1934 | Potter . |
| 2,076,212 | 4/1937 | Suter . |
| 2,090,778 | 7/1940 | Krasowski . |
| 2,123,075 | 7/1938 | Langa . |

(List continued on next page.)

FOREIGN PATENT DOCUMENTS

| | | |
|---|---|---|
| 163453 | 12/1985 | European Pat. Off. . |
| 2948265 | 5/1981 | Fed. Rep. of Germany . |
| 2036163 | 12/1970 | France . |
| 2272914 | 1/1976 | France . |
| 2489126 | 8/1980 | France . |
| 2619698 | 3/1989 | France . |
| 8101464 | 10/1982 | Netherlands . |
| 161005 | 6/1933 | Switzerland . |
| 560532 | 9/1972 | Switzerland . |
| 28130 | of 1907 | United Kingdom . |
| 1204647 | 9/1970 | United Kingdom . |

(List continued on next page.)

Primary Examiner—Timothy V. Eley
Attorney, Agent, or Firm—Dunlap, Codding & Lee

[57] ABSTRACT

A method of making a flower pot or flower pot cover comprising a base and a skirt connected to an upper end of the base. The base includes a plurality of overlapping folds for providing structural integrity. The skirt includes a plurality of folds which are not connected to provide an overall pleated appearance. Portions of the folds in the skirt are connected and portions of the folds in the skirt are unconnected. In one embodiment, some of the folds in the base are connected and the remaining portions of the folds in the base are unconnected.

27 Claims, 4 Drawing Sheets

U.S. PATENT DOCUMENTS

| | | |
|---|---|---|
| 2,152,648 | 4/1939 | Jones . |
| 2,278,673 | 4/1942 | Savada et al. . |
| 2,302,259 | 11/1942 | Rothfuss . |
| 2,355,559 | 8/1944 | Renner . |
| 2,411,328 | 11/1946 | MacNab . |
| 2,482,981 | 9/1949 | Kamrass . |
| 2,510,120 | 6/1950 | Leander . |
| 2,529,060 | 11/1950 | Trillich . |
| 2,586,078 | 2/1952 | O'Malley . |
| 2,774,187 | 12/1956 | Smithers . |
| 2,822,287 | 2/1958 | Avery . |
| 2,827,217 | 3/1958 | Clement . |
| 2,845,735 | 8/1958 | Werner . |
| 2,942,823 | 6/1960 | Chapman . |
| 2,967,652 | 1/1961 | Canfield . |
| 3,013,689 | 12/1961 | Shropshire . |
| 3,022,605 | 2/1962 | Reynolds . |
| 3,094,810 | 6/1963 | Kaplin . |
| 3,130,113 | 4/1964 | Silman . |
| 3,271,922 | 9/1966 | Wallerstein et al. . |
| 3,376,666 | 4/1968 | Leonard . |
| 3,488,022 | 1/1970 | Vittori . |
| 3,552,059 | 1/1971 | Moore . |
| 3,554,434 | 1/1971 | Anderson . |
| 3,620,366 | 11/1971 | Parkinson . |
| 3,681,105 | 8/1972 | Milutin et al. . |
| 3,775,903 | 12/1973 | Pike . |
| 3,869,828 | 3/1975 | Matsumoto . |
| 3,962,503 | 6/1976 | Crawford . |
| 3,974,960 | 8/1976 | Mitchell . |
| 4,043,077 | 8/1977 | Stonehocker . |
| 4,054,697 | 10/1977 | Reed et al. . |
| 4,096,987 | 6/1978 | Rodish . |
| 4,118,890 | 10/1978 | Shore . |
| 4,170,618 | 10/1979 | Adams . |
| 4,216,620 | 8/1980 | Weder et al. . |
| 4,250,664 | 2/1981 | Remke . |
| 4,283,032 | 8/1981 | Smith . |
| 4,297,811 | 11/1981 | Weder . |
| 4,300,312 | 11/1981 | Weder et al. . |
| 4,304,579 | 12/1981 | Granville et al. . |
| 4,338,979 | 7/1982 | Dow . |
| 4,340,146 | 7/1982 | Stratton . |
| 4,380,564 | 4/1983 | Cancio et al. . |
| 4,400,910 | 8/1983 | Koudstaal et al. . |
| 4,413,725 | 11/1983 | Bruno et al. . |
| 4,488,697 | 12/1984 | Garvey . |
| 4,508,223 | 4/1985 | Catrambone . |
| 4,621,733 | 11/1986 | Harris . |
| 4,717,262 | 1/1988 | Roen et al. . |
| 4,733,521 | 3/1988 | Weder et al. . |
| 4,773,182 | 9/1988 | Weder et al. . |
| 4,795,601 | 1/1989 | Cheng . |
| 4,835,834 | 6/1989 | Weder et al. . |
| 5,111,613 | 6/1989 | Weder . |

METHOD OF MAKING A FLOWER POT OR FLOWER POT COVER WITH PLEATED SKIRT

CROSS REFERENCED TO RELATES APPLICATIONS

This is a continuation of U.S. Ser. No. 07/938,724, filed Sep. 1, 1992, entitled "FLOWER POT OR FLOWER POT COVER WITH PLEATED SKIRT AND/OR BASE, now U.S. Pat. No. 5,259,106 which is a continuation of U.S. Ser. No. 693,906, filed May 1, 1991, entitled "FLOWER POT OR FLOWER POT COVER WITH PLEATED SKIRT AND OR BASE, now U.S. Pat. No. 5,181,339, which is a division of U.S. Ser. No. 397,114, filed Aug. 22, 1989, now U.S. Pat. No. 5,029,412; which is a continuation-in-part of U.S. Ser. No. 366,588, filed Jun. 15, 1989, now U.S. Pat. No. 5,111,613; which is a continuation-in-part of U.S. Ser. No. 219,083, filed Jul. 13, 1988, now U.S. Pat. No. 4,897,031; which is a continuation of U.S. Ser. No. 004,275, filed Jan. 5, 1987, now U.S. Pat. No. 4,773,182; which is a continuation of U.S. Ser. No. 613,080, filed May 22, 1984, now abandoned.

FIELD OF THE INVENTION

The present invention relates to flower pot covers or flower pots having skirts with folds in the skirt and a base with folds in the base wherein the folds in the skirt and/or in the base are selectively connected.

DESCRIPTION OF THE PREFERRED EMBODIMENTS

Figure 1:
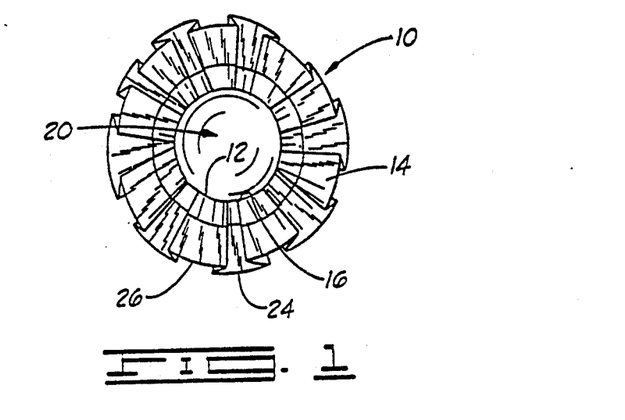
FIG. 1 is a top elevational view of the flower pot or flower pot cover constructed in accordance with the present invention.
Figure 2:
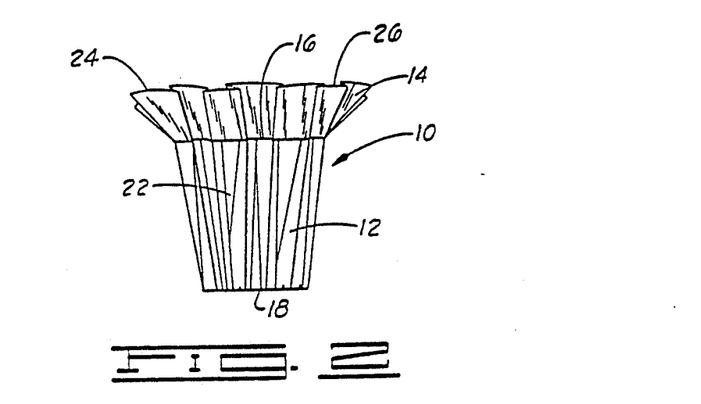
FIG. 2 is a side elevational view of the flower pot or flower pot cover of FIG. 1.
Figure 3:
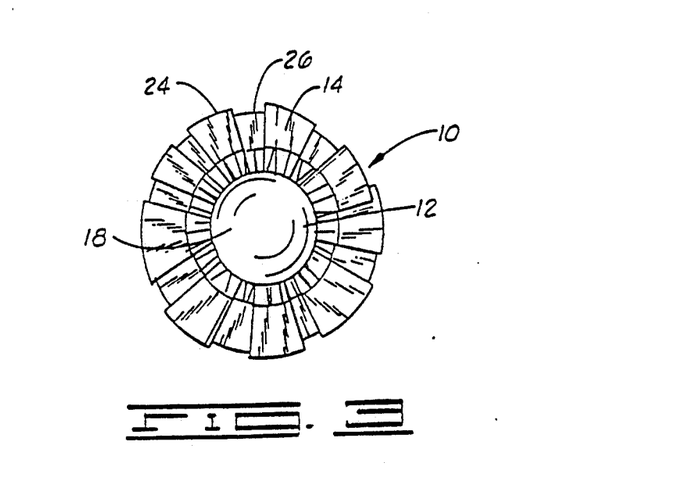
FIG. 3 is a bottom elevational view of the flower pot or flower pot cover of FIG. 1.

Shown in FIG. 1, 2 and 3 and designated therein by the reference numeral 10 is a flower pot or flower pot cover constructed in accordance with the present invention. In one embodiment, the article shown in the drawings is a flower pot cover which adapted for providing a decorative cover for a flower pot. In one other embodiment, the article shown in the drawings is a flower pot which is adapted to support floral groupings (defined below) in soil in a manner well known in the art.

The flower pot or flower pot cover 10 comprises a base 2 and a skirt 14.

The base 12 has an upper end 16 and a lower end 18. An object opening 20 (FIG. 1) is formed through the upper end 16 and the object opening 20 extends a distance through the base 12 with the base 12 substantially encompassing the object opening 20 except for the open upper end 16 of the base 12. The object opening 20 is the space substantially encompassed by the base 12.

The base 12 has a plurality of overlapping folds 22 (only one of the overlapping fold 22 being specifically designated by a reference numeral in FIG. 2) which extend at various angles and which have different and various lengths. The overlapping folds 22 in a preferred form are substantially fixed or connected. The overlapping folds 22 cooperate to provide structural integrity for maintaining the preformed shape of the base 12.

The skirt 14 is connected to the upper end 16 of the base 12. Preferably, the skirt 14 is formed integrally with the base 12. The skirt 14 extends outwardly from the upper end 16 of the base 12 terminating with an outer peripheral surface 24. A plurality of folds 26 (only one of the folds 26 being designated with a reference numeral in FIGS. 1 and 3) are formed in the skirt 14. Each of the folds 26 extends generally from the upper end 16 of the base 12 outwardly toward the outer peripheral surface 24 of the skirt 14. A substantial portion of the folds 26 are unconnected to provide an overall pleated appearance to the flower pot cover or flower pot 10.

The flower pot or flower pot cover 10 is formed by taking a sheet of material and disposing the sheet of material between a male and female mold. When the molds are brought together in mating engagement with the sheet of material therebetween the overlapping folds 22 are formed. The folds 22 can be substantially permanently connected or fixed by heat sealing the overlapping folds 22, or adhesively connecting the overlapping folds In a preferred form, the flower pot or flower pot cover 10 is preformed from a sheet of material in a manner substantially like that described in the patent entitled "Article Forming System" U.S. Pat. No. 4,773,182, issued on Sep. 27, 1988 and in the co-pending continuation patent application entitled "Article Forming System,, U.S. Ser. No. 219,083, filed Jul. 13, 1988, referred to before. The disclosure in U.S. Pat. No. 4,773,172, specifically is incorporated herein by reference.

The flower pot or flower pot cover 10 may be constructed of a material selected from a group of materials consisting of a man-made organic polymer film, paper (treated or untreated or combinations thereof), burlap, cloth (natural or synthetic or combinations thereof), denim, foil, cling wrap, or cellophane or combinations thereof.

In one preferred embodiment, the flower pot or flower pot cover 10 is constructed from a relatively thin film of substantially non-shape sustaining man-made organic polymer film. The term "man-made organic polymer film" as used herein means a man-made resin such as a polyproplyene as opposed to naturally occurring resins such as cellophane. A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally a relatively thin film of substantially linearly 1 inked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheetlike format for wrapping purposes consistent with the present invention.

The flower pot or flower pot cover 10 may be constructed of a single layer of material or a plurality of layers of the same or different types of material. The flower pot or flower pot cover 10 may have any thickness. In one preferred embodiment, the flower pot or flower pot cover 10 is constructed from two polypropylene films laminated together (a 20"×15" sheet of Mobil 270 ABW white opaque film laminated to a 20"×15" sheet of Mobil 220 AB clear film). The flower pot or flower pot cover 10 preferably has a thickness in a range of from less than about 1.0 mil to about 2.5 mils, although the thickness of the flower pot or flower pot cover 10 may be in a range from less than about 1.0 mil to about 30 mils and preferably the thickness is less than about 6 mils.

The term "cling wrap" as used herein may be any material which is capable of connecting to flower pot 10 and/or itself upon contacting engagement and is wrappable about flower pot 10 whereby portions of the cling wrap contactingly engage and connect to other portions of the cling wrap and/or the flower pot 10 for generally securing the sheet of material 32 wrapped about at least a portion of the flower pot 10. This connecting engagement is generally temporary in that the cling wrap material may be easily removed without tearing same. Preferably the cling wrap material is constructed and treated if necessary, from polyethylene such as Cling Wrap made by GladN, First Brands Corporation, Danbury, Connecticut. Generally, the cling wrap material will range in thickness from less than about 0.2 mils to about 10 mils, and preferably less than about 0.5 mils to about 2.5 mils and most preferably from less than about 0.6 mils to about 2 mils. However, any thickness of cling wrap material may be utilized in accordance with the present invention which permits the cling material to function as previously described.

In a preferred form, a decorative pattern is formed or printed or embossed or otherwise disposed on or incorporated in the outer peripheral surface of the flower pot or flower pot cover 10. The term "decorative pattern" as used herein means a color and/or an embossed pattern and/or other decorative surface ornamentation, including, but not limited to printed designs, coatings, flocking or metallic finishes. The flower pot or flower pot cover 10 may be constructed of a sheet of material which is totally or partially clear or tinted transparent material. It also should be noted that a decorative pattern may be incorporated on the interior surface of the base 12 formed by the object opening 20 which may be desired in some applications.

The term "floral grouping" as used herein means cut fresh flowers, artificial flowers, other fresh and/or artificial plants or other floral materials and may include other secondary plants and/or ornamentation which add to the aesthetics of the overall floral grouping.

Figure 4:
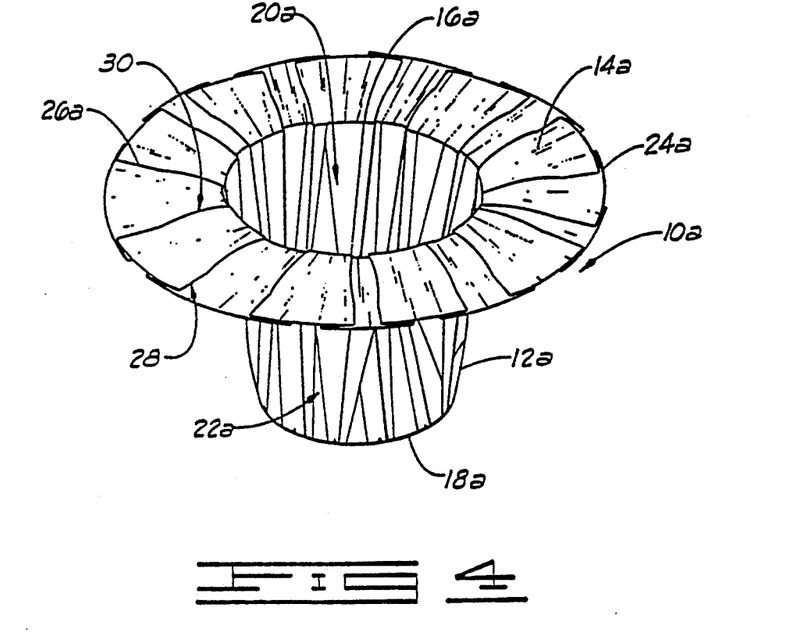
FIG. 4 is a partial perspective view of a flower pot or flower pot cover with a portion of the folds in the skirt 20 near the outer peripheral surface of the skirt being substantially permanently fixed.

EMBODIMENT OF FIG. 4

Shown in FIG. 4 is a flower pot or flower pot cover 10a which is constructed exactly like the flower pot or flower pot cover 10 described in detail before, except a portion 28 of the folds 26a generally near and spaced a distance from the outer peripheral surface 24a of the skirt 14a are connected or substantially permanently fixed. A remaining portion 30 of the folds 26a in the skirt 14a are not connected or permanently fixed. The folds 26a in the skirt 14 which are connected or fixed may be connected or fixed by heat sealing or adhesively connecting.

Figure 5:
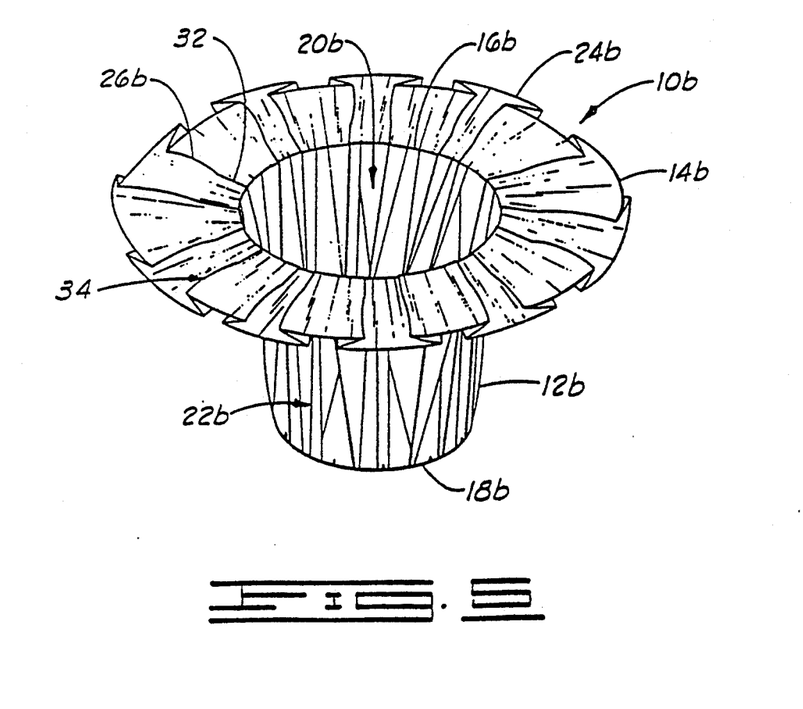
FIG. 5 is a partial perspective view of a flower pot or flower pot cover with a portion of the folds in the skirt near the connection of the skirt to base being substantially permanently fixed.

EMBODIMENT OF FIG. 5

Shown in FIG. 5 is a flower pot or flower pot cover 10b which is constructed exactly like the flower pot or flower pot cover 10 described in detail before, except a portion 32 of the folds 26b generally near and extending a distance from the connection of the skirt 14b to the upper end 16b of the base 12b are connected or substantially permanently fixed. A remaining portion 34 of the folds 26b in the skirt 14b are not connected or permanently fixed.

Figure 6:
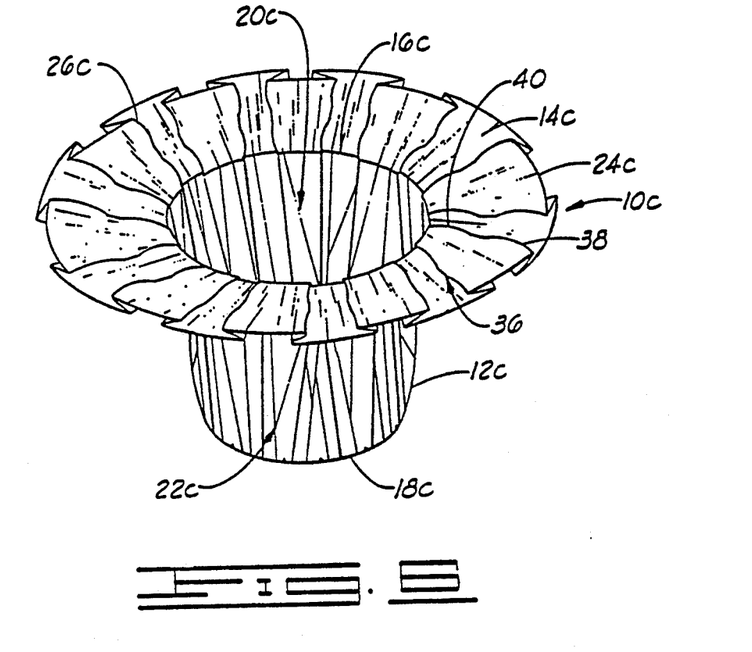
FIG. 6 is a partial perspective view of a flower pot or flower pot cover with a portion of the folds in the skirt generally between the connection of the skirt to the base and the outer peripheral surface of the skirt being substantially permanently fixed.

EMBODIMENT OF FIG. 6

Shown in FIG. 6 is a flower pot or flower pot cover 10c which is constructed exactly like the flower pot or flower pot cover 10 described in detail before, except a portion 36 of the folds 26c at a position generally between the outer peripheral surface 24b and the connection of the skirt 14b to the upper end 16b of the base 12b are connected or substantially permanently fixed. A remaining 38 of the folds 26b generally between the outer peripheral surface 24b and the portion 36 are not connected or substantially permanently fixed. Another remaining portion 40 of the folds 26b generally between the connection of the skirt 14b to the upper end 16b of the base 12b and the portion 36 are not connected or substantially permanently fixed.

The portions 28, 32 and. 36 shown in FIGS. 4, 5 and 6, respectively, can be combined with each or some of the portions 28, 32 and 36 and the portions 28, 32 and 36 may extend only a partial distance circumferentially about the skirt.

Figure 7:
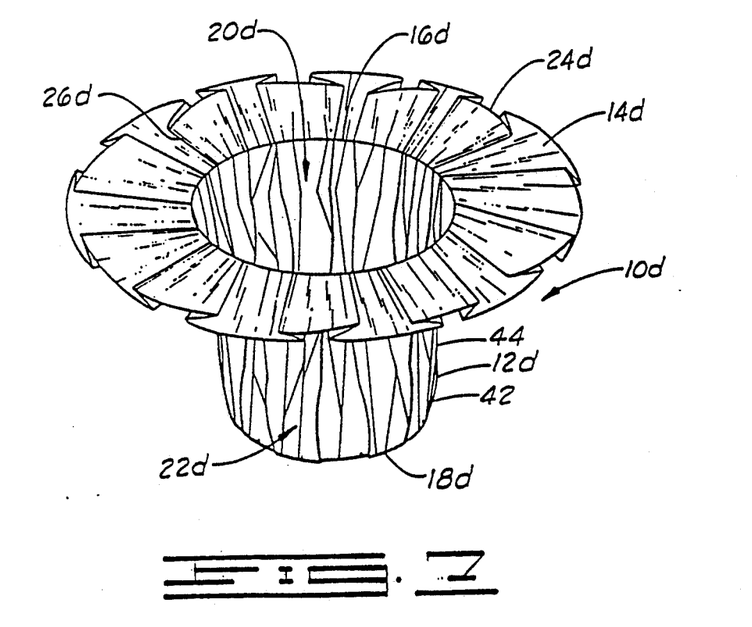
FIG. 7 is a partial perspective view of a flower pot or flower pot cover with a portion of the folds in the base generally near the upper end of the base of being substantially permanently fixed and the remaining folds in the base being unconnected.

EMBODIMENT OF FIG. 7

Shown in FIG. 7 is a flower pot or flower pot cover 10d which is constructed exactly like the flower pot or flower pot cover 10 described in detail before, except a portion 42 of the folds 22d in the base 12d generally near the lower end 18d and extending a distance therefrom are not substantially permanently fixed or connected. A remaining portion 44 of the folds 22d in the base 12d are substantially permanently fixed or connected.

Figure 8:
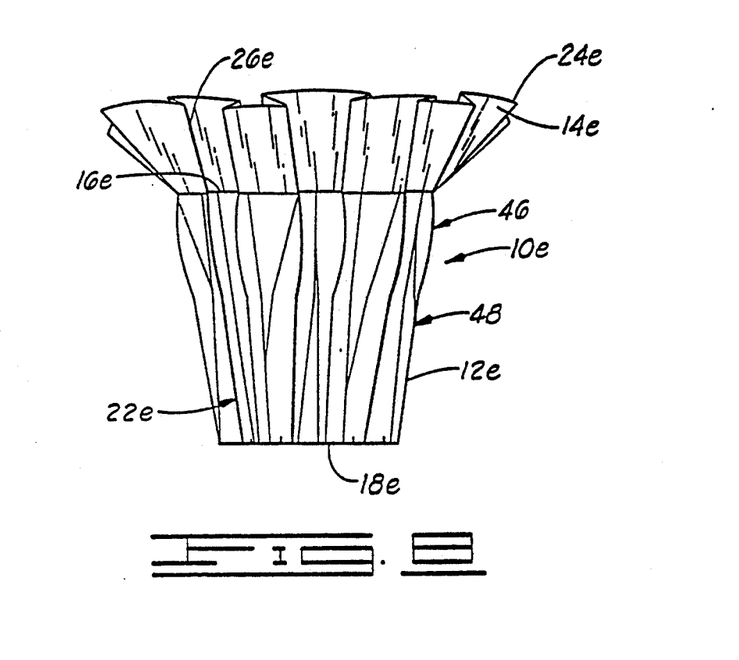
FIG. 8 is a side elevational view of a flower pot or flower pot cover with the folds in the base generally near the lower end being substantially permanently fixed and the folds in the base generally near the upper end being substantially unconnected.

EMBODIMENT OF FIG. 8

Shown in FIG. 8 is a flower pot or flower pot cover 10e which is constructed exactly like the flower pot or flower pot cover 10 described in detail before, except a portion 46 of the folds 22d in the base 12d generally near the upper end 18d and extending a distance therefrom are not substantially permanently fixed or connected. A remaining portion 48 of the folds 22d are substantially permanently fixed or connected.

Figure 9:
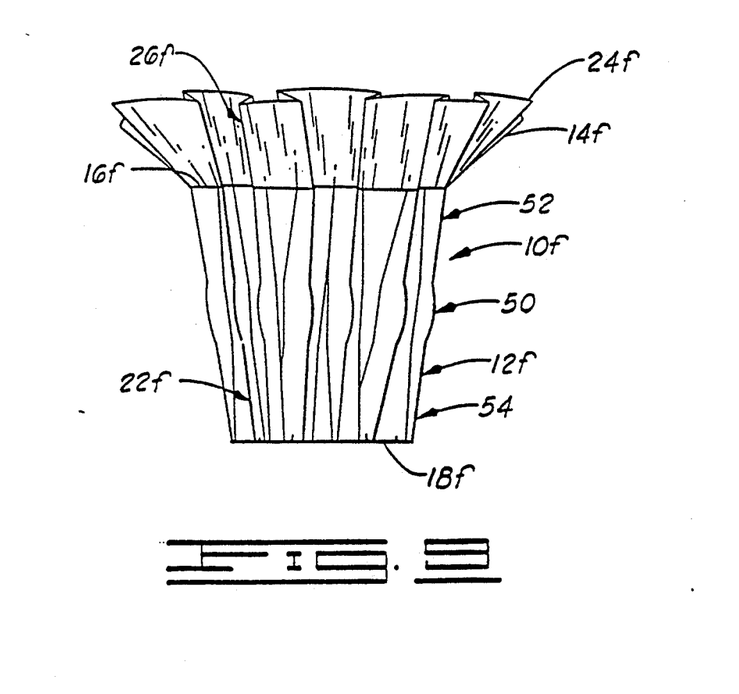
FIG. 9 is a side elevational view of a flower pot or flower pot cover with folds in the base wherein the folds in the base generally near the upper end and generally near the lower end thereof are substantially permanently fixed and the folds at an intermediate position generally between the upper and the lower end portions of the base are substantially unconnected.

EMBODIMENT OF FIG. 9

Shown in FIG. 9 is a flower pot or flower pot cover 10f which is constructed exactly like the flower pot or flower pot cover 10 described in detail before, except a portion 50 of the folds 22f generally between the upper and lower ends 16f and 18f are not connected or permanently fixed. A remaining portion 52 of the folds 22f generally between the portion 50 and the upper end 16f are substantially permanently connected or fixed. Another remaining portion 54 generally between the portion 50 and the lower end 18f are substantially permanently connected or fixed.

Changes may be made in the construction of the flower pot or flower pot cover 10 as described herein and changes may be made in the steps or the sequence of steps of the methods described herein without departing from the spirit and scope of the invention as defined in the following claims.

What is claimed is:

1. A method for making a flower pot of flower pot cover, comprising:
    forming a base having an upper end and a lower end with an object opening extending through the upper end;
    forming a skirt connected to the upper end of the base and extending outwardly from the upper end of the base terminating with an outer peripheral surface, the skirt having a plurality of folds extending from about the upper end of the base outwardly toward the outer peripheral surface of the skirt; and
    connecting permanently a portion of the folds in the skirt between the upper end of the base and a position spaced a distance from the outer peripheral surface of the skirt toward the upper end of the skirt forming connected folds with said portion having the connected folds extending circumferentially about the skirt and a remaining portion of the folds in the skirt between the outer peripheral surface of the skirt and said portion with the connected folds being substantially free of folds with said remaining portion extending circumferentially about the skirt.

2. The method of claim 1 wherein the flower pot cover is constructed of a material selected from a group of materials consisting of a man-made organic polymer film, treated and/or untreated paper, burlap, natural and/or synthetic cloth, denim, foil, cling wrap, or cellophane or combinations thereof.

3. The method of claim 1 wherein the base and the skirt each are defined further as having a thickness in a range from less than about 1.0 mil to about 30 mils.

4. The method of claim 1 wherein the base and the skirt each are defined further as having a thickness of less than about 6 mils.

5. A method for making a flower pot or flower pot cover comprising:
    forming a base having an upper end and a lower end with an object opening extending through the upper end;
    forming a skirt connected to the upper end of the base and extending outwardly from the upper end of the base terminating with an outer peripheral surface, the skirt having a plurality of folds extending from about the upper end of the base outwardly toward the outer peripheral surface of the skirt; and
    connecting permanently a portion of the folds in the skirt between the outer peripheral surface of the skirt and a position spaced a distance from the outer peripheral surface of the skirt toward the upper end of the base forming connected folds with said portion having the connected folds extending circumferentially about the skirt and a remaining portion of the folds between the upper end of the base and said portion having the connected folds in the skirt being substantially free of overlapping folds with said remaining portion extending circumferentially about the skirt.

6. The method of claim 5 wherein the flower pot cover is constructed of a material selected from a group of materials consisting of a man-made organic polymer film, treated and/or untreated paper, burlap, natural and/or synthetic cloth, denim, foil, cling wrap, or cellophane or combinations thereof.

7. The method of claim 5 wherein the base and the skirt each are defined further as having a thickness in a range from less than about 1.0 mil to about 30 mils.

8. The method of claim 5 wherein the base and the skirt each are defined further as having a thickness of less than about 6 mils.

9. A method for making a flower pot or flower pot covering comprising:
    forming a base having an upper end and a lower end with an object opening extending through the upper end;
    forming a skirt connected to the upper end of the base and extending outwardly from the upper end of the base terminating with an outer peripheral surface, the skirt having a plurality of folds extending from about the upper end of the base outwardly toward the outer peripheral surface of the skirt; and
    connecting substantially permanently a portion of the folds in the skirt generally between the outer peripheral surface of the skirt and the connection of the skirt to the upper end of the base forming connected folds with said portion having the connected folds extending circumferentially about the skirt, a remaining portion of the folds in the skirt between said portion having the connected folds and the outer peripheral surface of the skirt being substantially free of folds with said remaining portion extending circumferentially about the skirt, and another remaining portion of the folds in the skirt between the upper end of the base and said portion having the connected folds being substantially free of folds with said another remaining portion extending circumferentially about the base.

10. The method of claim 9 wherein the flower pot cover is constructed of a material selected from a group of materials consisting of a man-made organic polymer film, treated and/or untreated paper, burlap natural and/or synthetic cloth, denim, foil, cling wrap, or cellophane or combinations thereof.

11. The method of claim 9 wherein the base and the skirt each are defined further as having a thickness in a range from less than about 1.0 mil to about 30 mils.

12. The method of claim 9 wherein the base and the skirt each are defined further as having a thickness of less than about 6 mils.

13. A method for making a flower pot or flower pot cover comprising:
forming a base having an upper end and a lower end with an object opening extending through the upper end and having a plurality of folds formed in the base for cooperating to provide structural integrity to the base; and
connecting permanently a portion of the folds in the base between the lower end of the base and a position spaced a distance from the lower end of the base toward the upper end of the base forming connected folds with said portion having connected folds extending circumferentially about the base, and a remaining portion folds in the base between the upper end of the base and said portion having the connected folds being substantially free of folds with said remaining portion extending circumferentially about the base.

14. The method of claim 13 further comprising:
forming a skirt connected to the upper end of the base and extending a distance generally outwardly from the upper end of the base.

15. The method of claim 13 wherein the flower pot cover is constructed of a material selected from a group of materials consisting of a man-made organic polymer film, treated and/or untreated paper, burlap, natural and/or synthetic cloth, denim, foil, cling wrap, or cellophane or combinations thereof.

16. The method of claim 13 wherein the base and the skirt each are defined further as having a thickness in a range from less than about 1.0 mil to about 30 mils.

17. The method of claim 13 wherein the base and the skirt each are defined further as having a thickness of less than about 6 mils.

18. A method for making a flower pot or flower pot cover comprising:
forming a base having an upper end and a lower end with an object opening extending through the upper end and having a plurality of folds formed in the base for cooperating to provide structural integrity to the base; and
connecting permanently a portion of the folds in the base between the upper end of the base and a position spaced a distance from the upper end of the base forming connected folds with said portion having the connected folds extending circumferentially about the base and a remaining portion of the folds in the base between the lower end of the base and said portion having the connected folds being substantially free of folds with said remaining portion extending circumferentially about the base.

19. The method of claim 18 further comprising:
forming a skirt connected to the upper end of the base and extending a distance generally outwardly from the upper end of the base.

20. The method of claim 18 wherein the flower pot cover is constructed of a material selected from a group of materials consisting of a man-made organic polymer film, treated and/or untreated paper, burlap, natural and/or synthetic cloth, denim, foil, cling wrap, or cellophane or combinations thereof.

21. The method of claim 18 wherein the base and the skirt each are defined further as having a thickness in a range from less than about 1.0 mil to about 30 mils.

22. The method of claim 18 wherein the base and the skirt each are defined further as having a thickness of less than about 6 mils.

23. A method for making a flower pot or flower pot cover comprising:
forming a base having an upper end and a lower end with an object opening extending through the upper end and having a plurality of folds formed in the base for cooperating to provide structural integrity to the base; and
connecting permanently a portion of the folds in the base between the upper and lower ends of the base forming connected folds with said portion having connected folds extending circumferentially about the base, and a remaining portion of the folds in the base between said portion having the connected folds and the upper end of the base being substantially free of folds and said remaining portion extending circumferentially about the base, and another remaining portion of the folds in the base between said portion having the connected folds and the lower end of the base being substantially free of folds and said another remaining portion extending circumferentially about the base.

24. The method of claim 23 further comprising:
forming a skirt connected to the upper end of the base and extending a distance generally outwardly from the upper end of the base.

25. The method of claim 23 wherein the flower pot cover is constructed of a material selected from a group of materials consisting of a man-made organic polymer film, treated and/or untreated paper, burlap, natural and/or synthetic cloth, denim, foil, cling wrap, or cellophane or combinations thereof.

26. The method of claim 23 wherein the base and the skirt each are defined further as having a thickness in a range from less than about 1.0 mil to about 30 mils.

27. The method of claim 23 wherein the base and the skirt each are defined further as having a thickness of less than about 6 mils.

* * * * *

UNITED STATES PATENT AND TRADEMARK OFFICE
CERTIFICATE OF CORRECTION

PATENT NO. : 5,327,635
DATED : July 12, 1994
INVENTOR(S) : Weder et al.

It is certified that error appears in the above-identified patent and that said Letters Patent is hereby corrected as shown below:

Column 1, line 9, before "FLOWER", please insert --METHOD OF MAKING A--.

Column 1, line 11, please delete "AND/OR BASE".

Column 1, line 54, please delete "a portion of".

Column 1, line 55, after "base", please delete "of".

Column 2, line 17, please delete "2", and substitute therefore --12--.

Column 2, line 61, after "System,", please delete --,--.

Column 3, line 23, please delete "1 inked", and substitute therefore --linked--.

Column 3, line 52, please delete "32".

Column 4, line 28, please delete "14", and substitute therefore --14a--.

UNITED STATES PATENT AND TRADEMARK OFFICE
CERTIFICATE OF CORRECTION

PATENT NO. : 5,327,635
DATED : July 12, 1994
INVENTOR(S) : Weder et al.

It is certified that error appears in the above-identified patent and that said Letters Patent is hereby corrected as shown below:

Column 4, line 51, after "remaining", please insert --portion--.

Column 5, line 11, please delete "18d", and substitute therefore --16d--.

Signed and Sealed this

Seventh Day of February, 1995

Attest:

BRUCE LEHMAN

Attesting Officer

Commissioner of Patents and Trademarks